(12) United States Patent
Song et al.

(10) Patent No.: US 10,027,117 B2
(45) Date of Patent: Jul. 17, 2018

(54) MULTI-POWER FACTOR CONTROLLER

(71) Applicant: SN Co., Ltd., Daejoen (KR)

(72) Inventors: Soo Joon Song, Daejeon (KR); Myung Sub Yoon, Daejeon (KR)

(73) Assignee: SN CO., LTD., Daejeon (KR)

( * ) Notice: Subject to any disclaimer, the term of this patent is extended or adjusted under 35 U.S.C. 154(b) by 78 days.

(21) Appl. No.: 15/109,024

(22) PCT Filed: Oct. 5, 2015

(86) PCT No.: PCT/KR2015/010492
§ 371 (c)(1),
(2) Date: Jun. 29, 2016

(87) PCT Pub. No.: WO2016/190492
PCT Pub. Date: Dec. 1, 2016

(65) Prior Publication Data
US 2017/0149245 A1    May 25, 2017

(30) Foreign Application Priority Data

May 22, 2015   (KR) .................. 10-2015-0072158

(51) Int. Cl.
*H02J 3/18*   (2006.01)
(52) U.S. Cl.
CPC .................... *H02J 3/18* (2013.01)
(58) Field of Classification Search
USPC .......................................... 307/31
See application file for complete search history.

(56) References Cited

FOREIGN PATENT DOCUMENTS

| JP | 08-251824 A | 9/1996 |
|---|---|---|
| JP | 10-174292 | * 6/1998 |
| JP | 10-174292 A | 6/1998 |
| JP | 2014-123299 A | 7/2014 |
| KR | 10-1998-0019407 A | 6/1998 |
| KR | 100652240 | * 11/2006 |
| KR | 10-0652240 B1 | 12/2006 |

OTHER PUBLICATIONS

International Search Report for PCT/KR2015/010492 dated Feb. 22, 2015 from Korean Intellectual Property Office.

* cited by examiner

*Primary Examiner* — Rexford Barnie
*Assistant Examiner* — Xuan Ly
(74) *Attorney, Agent, or Firm* — Paratus Law Group, PLLC

(57) ABSTRACT

A multi-power factor controller including k measuring units, to which k loads and a power supply path are connected, each of the k measuring units being connected with each of the k loads and measuring a power factor calculation parameter of a connected load; n condensers; n contactors, each of the n contactors including k electromagnetic contactors, connected to the k loads and one of the condensers; n relay units, each of the n relay units having k relays, respectively connected to the k electromagnetic contactors, for deciding whether to turn on or off the electromagnetic contactors; and a multi-power factor control unit for controlling a corresponding relay to turn on the electromagnetic contactor to which the first condenser and the target load are connected.

1 Claim, 6 Drawing Sheets

MULTI-POWER FACTOR CONTROLLER

CROSS REFERENCE TO PRIOR APPLICATIONS

This application is a National Stage Patent Application of PCT International Patent Application No. PCT/KR2015/010492 (filed on Oct. 5, 2015) under 35 U.S.C. § 371, which claims priority to Korean Patent Application No. 10-2015-0072158 (filed on May 22, 2015), which are all hereby incorporated by reference in their entirety.

TECHNICAL FIELD

The present invention relates, in general, to multi-power factor control and, more particularly, to a multi-power factor controller that is capable of performing uniform power factor control for multiple loads.

BACKGROUND ART

Generally, the term "power factor" indicates the ratio of active power to apparent power. That is, the power factor is the ratio of power used to actually perform work to input power. A power factor is used as an important control factor in a place in which power control is necessary or in which technology for preventing wasted power consumption is necessary.

Power factor control serves to raise the power factor of a load with the aim of achieving a desired power factor. In the power factor control method mainly used by power utilities, the power factor is raised by decreasing apparent power. Here, the apparent power involves reactive power. The higher the reactive power, the higher the apparent power, but the lower the reactive power, the lower the apparent power. Accordingly, the apparent power may be decreased by decreasing reactive power, whereby the power factor may be ameliorated.

Meanwhile, in a device for controlling power factors for a switching board, a motor control board, or multiple loads, power factor control is individually performed for each of various kinds of loads (i.e. transformers, motors, home appliances, lighting products, etc.), and a great number of condensers is used to individually control the power factors of the respective loads. Therefore, a conventional switching board is problematic in that a high installation cost is incurred due to the use of multiple condensers. Also, because power factor control must be performed differently for the respective loads, a separate power factor controller must be installed for each of the loads. This results in an increase in the number of components and complicates design related to power factor control.

A power factor may be categorized into a lagging power factor, in which the phase of current lags the phase of voltage, and a leading power factor, in which the phase of current leads the phase of voltage. In most systems including a switching board, a lagging power factor is used as a power factor for loads such as motors and transformers, and in order to augment the power factor, a condenser is installed. Condensers may be installed in the bus-bar of a switching board in a centralized arrangement, may be installed so as to be distributed among the center and loads, or may be installed to be distributed to the terminals of loads. When a power factor is a leading power factor, a reactor may be used to increase the power factor.

DOCUMENTS OF RELATED ART (Patent Document 1) Korean Patent No. 10-0333973 (registered on Apr. 11, 2002); and
(Patent Document 2) Korean Patent No. 10-0329829 (registered on Mar. 11, 2002).

DISCLOSURE

Technical Problem

An object of the present invention is to provide a multi-power factor controller that is capable of performing uniform power factor control of multiple loads.

Another object of the present invention is to provide a multi-power factor controller that may effectively and economically perform power factor control by reducing the number of condensers that are used.

A further object of the present invention is to provide a multi-power factor controller that can be used by being installed in a device in which power factor control of multiple loads is necessary.

Technical Solution

In order to accomplish the above objects, a multi-power factor controller is provided. The multi-power factor controller includes k measuring units, to which k loads and a power supply path are connected, each of the k measuring units being connected with each of the k loads and measuring a power factor calculation parameter of a connected load; n condensers; n contactors, each of the n contactors including k electromagnetic contactors, which are respectively connected to the k loads and are connected to any one of the condensers; n relay units, each of the n relay units having k relays, respectively connected to the k electromagnetic contactors, for deciding whether to turn on or off the electromagnetic contactors connected thereto; and a multi-power factor control unit for calculating a power factor of each of the loads using the power factor calculation parameter provided from each of the k measuring units, detecting a target load and an amount by which a power factor is to be adjusted for the target load by comparing the calculated power factor of each of the loads with a preset reference power factor, selecting at least one first condenser corresponding to the amount by which the power factor is to be adjusted for the target load, and controlling a corresponding relay to turn on the electromagnetic contactor to which the first condenser and the target load are connected.

Advantageous Effects

According to an embodiment of the present invention, power factor control may be uniformly performed for at least one load, the power factor of which needs to be controlled, selected from among multiple loads. Also, because uniform power factor control of multiple loads may be performed using only an optimal number of condensers, costs may be reduced, and multiple power factor control boards, which are necessary in a number equal to the number of loads, are configured as a single panel, whereby it may be installed in a small electrical room so as to make better use of space.

Also, when the power factor of at least one load cannot be increased to a desired power factor, information about this is provided to a worker, whereby the worker may check whether a condenser is faulty. Also, when it is necessary to install additional condensers, the minimum number of condensers may be detected and installed.

BEST MODE

Figure 1:
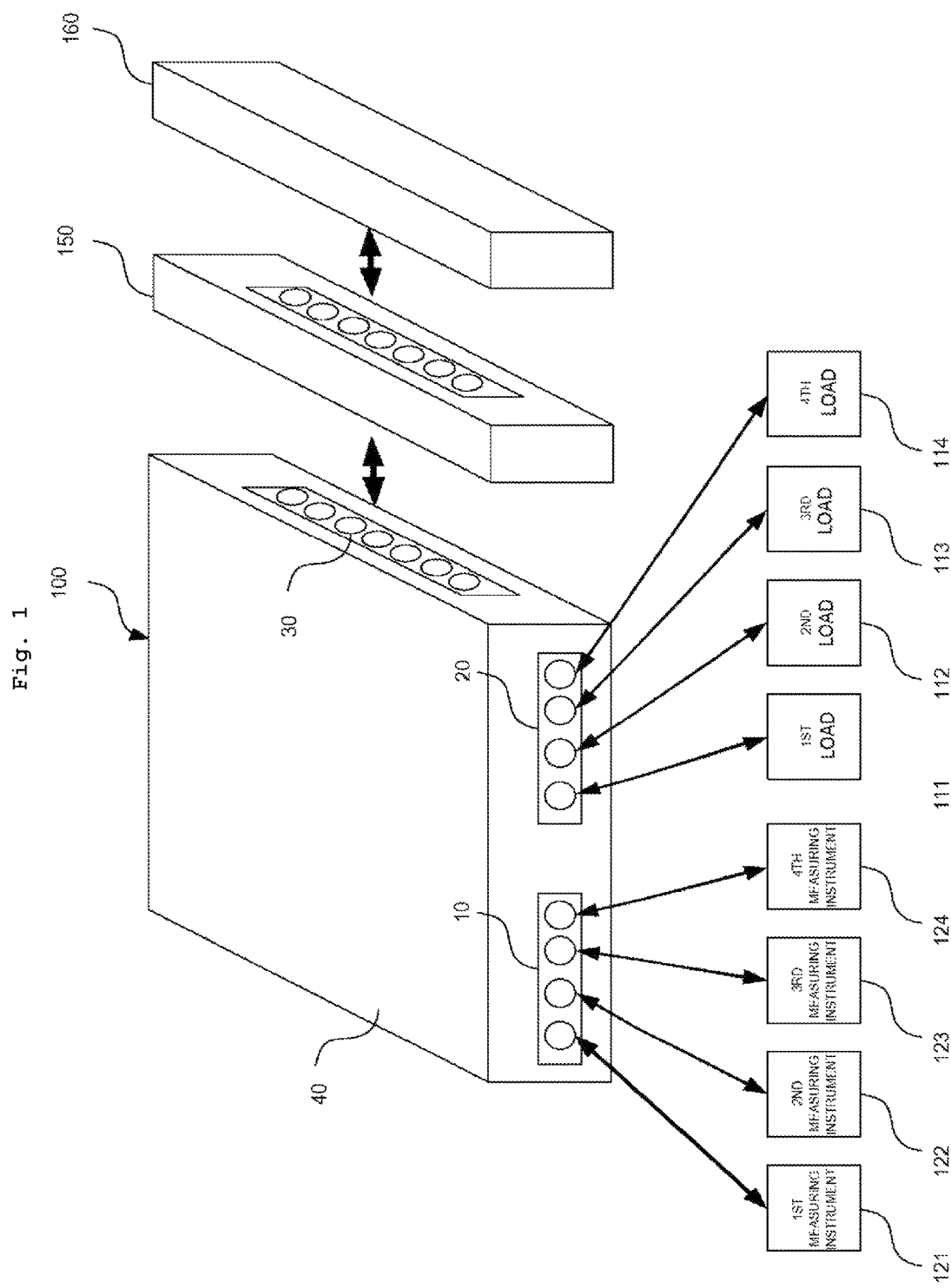
FIG. 1 is a view illustrating the outward form of a multi-power factor controller according to an embodiment of the present invention.

The present invention may be variously changed, and may have various embodiments, and specific embodiments will be described in detail below with reference to the attached drawings. However, it should be understood that those embodiments are not intended to limit the present invention to specific disclosure forms and they include all changes, equivalents or modifications included in the spirit and scope of the present invention.

In the following description of the present invention, the same reference numerals are used to designate the same or similar elements throughout the drawings. Descriptions of known functions and configurations which have been deemed to make the gist of the present invention unnecessarily obscure will be omitted below.

It will be understood that although the terms "first," "second," etc. may be used herein to describe various elements, these elements should not be limited by these terms. These terms are only used to distinguish one element from another element.

For example, a first element discussed below could be teamed a second element without departing from the nature of the present invention. Similarly, a second element could be termed a first element.

As used herein, the term "and/or" includes any and all combinations of one or more of the associated listed items.

It will be understood that when an element is referred to as being "on" another element, it can be directly on the other element or intervening elements may be present therebetween.

In contrast, when an element is referred to as being "directly on" another element, there are no intervening elements present.

The terminology used herein is for the purpose of describing particular embodiments only and is not intended to limit the invention.

As used herein, the singular forms are intended to include the plural forms as well, unless the context clearly indicates otherwise. It will be further understood that the terms "comprises" and/or "comprising," or "includes" and/or "including," when used in this specification, specify the presence of stated features, integers, steps, operations, elements and/or components, but do not preclude the presence or addition of one or more other features, integers, steps, operations, elements, components and/or groups thereof.

Unless otherwise defined, the meaning of all teams including technical and scientific terms used herein is the same as that commonly understood by one of ordinary skill in the art to which the present invention belongs.

It will be further understood that terms, such as those defined in commonly used dictionaries, should be interpreted as having a meaning which is consistent with their meaning in the context of the relevant art and the present disclosure, and are not to be interpreted in an idealized or overly formal sense unless expressly so defined herein.

Hereinafter, a multi-power factor controller according to an embodiment of the present invention will be described with reference to the accompanying drawings.

FIG. 1 is a view illustrating the outward form of a multi-power factor controller according to an embodiment of the present invention. As illustrated in FIG. 1, a multi-power factor controller 100 according to an embodiment of the present invention is configured such that the internal components (electrical circuit boards, electronic components, electrical components) thereof are protected by a housing 40, and a first connection port 10, electrically connected with multiple measuring instruments 121 to 124, is installed on one side of the controller. The number of measuring instruments connected to the multi-power factor controller 100 of the present invention is two or more, and the number is determined by a designer. FIG. 1 shows an example in which there are four measuring instruments.

The measuring instruments 121 to 124, connected to the multi-power factor controller 100 of the present invention, are electrically connected to loads, the power factor of which is to be controlled by the multi-power factor controller 100 of the present invention, and serve to measure the power factor control parameters of the loads and to provide the measured power factor control parameters to the multi-power factor controller 100 via the connection port. Of course, the multi-power factor controller 100 of the present invention may be produced in such a way that the multiple measuring instruments 121 to 124 are embedded therein.

The multi-power factor controller 100 includes a second connection port 20 in order to form power supply paths with multiple loads 111 to 114. The multi-power factor controller 100 is connected with the multiple loads 111 to 114 via the second connection port 20, and the multiple loads 111 to 114, connected to the second connection port 20, have one-to-one connections with respective embedded measuring instruments.

Meanwhile, a third connection port 30 is installed on another side of the multi-power factor controller 100 of the present invention. When the third connection port 30 is installed, multiple power factor adjusting elements (i.e. condensers, reactors, or the like) are not installed therein. The multi-power factor controller 100 needs multiple power factor adjusting elements in order to control power factors, and to this end, it is electrically connected to a power factor adjusting element pack 160, which includes multiple power factor adjusting elements, via the third connection port 30.

If the power of a load, the power factor of which is to be adjusted, is so high that the internal relay can be damaged when the power factor is adjusted, the power factor adjusting element pack 160 may be used in such a way that the load is connected to a contact device 150, which includes multiple electromagnetic contactors (i.e. magnetic switches or the like), via the third connection port 30 and the power factor adjusting element pack 160 is connected to the contact device 150.

Meanwhile, the first and second connection ports are described as being installed on one side of the multi-power factor controller 100, but the position at which the connection ports are installed is not limited thereto, and they may be installed at any position of the housing 40 of the multi-power factor controller 100.

Figure 2:
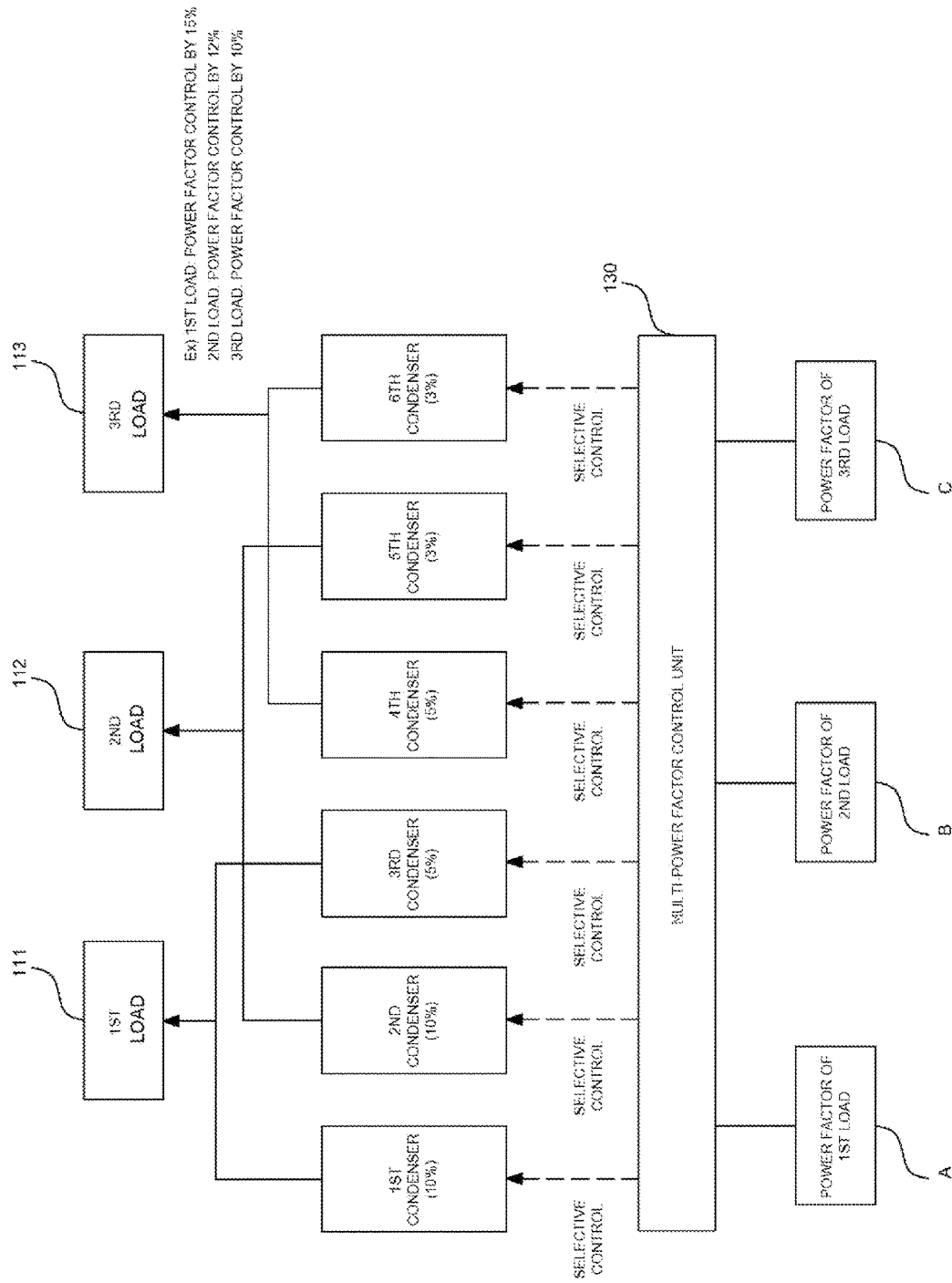
FIG. 2 is a concept diagram for multi-power factor control according to an embodiment of the present invention.

Hereinafter, the concept of multi-power factor control according to an embodiment of the present invention will be described with reference to FIG. 2. FIG. 2 is a concept diagram of multi-power factor control according to an embodiment of the present invention, and shows an example in which there are three loads.

As illustrated in FIG. 2, in the multi-power factor controller 100 according to an embodiment of the present invention, a multi-power factor control unit 130 detects the power factor A of the first load 111, the power factor B of the second load 112, and the power factor C of the third load 113 all together, compares each of the detected power factors A, B, and C with a preset reference power factor (that is, a desired power factor), designates a load having a power factor that is lower than the reference power factor as a target load, and performs power factor control for the target load. Here, the number of target loads may be one, two, or three.

Here, power factor control may be performed by deciding how large an increase in the power factor is necessary for the target load. In other words, power factor control may be performed by determining the amount by which a power factor is to be adjusted.

Therefore, the multi-power factor control unit 130 basically determines whether there is a target load among the multiple loads, and if there are target loads, it serves to determine the amount by which to adjust the power factor for each of the target loads. Here, the amount by which to adjust the power factor is the difference between the reference power factor and each of the power factors A, B, and C of the first to third loads 111 to 113. For example, if the reference power factor is 90% and the power factor A of the first load is 70%, the amount by which to adjust the power factor is 20%.

Also, the multi-power factor controller 100 according to an embodiment of the present invention uses the minimum number of power factor adjusting elements (i.e. condensers or reactors) capable of performing power factor control for each of the loads. Here, the multiple power factor adjusting elements may have the same capacity (that is, they may increase the power factor by the same amount) or different capacities. Alternatively, power factor adjusting elements having the same capacity and power factor adjusting elements having different capacities may be used together.

In this environment, the multi-power factor controller 100 adjusts the power factor of a single target load by applying (connecting) at least one power factor adjusting element, which corresponds to the amount by which the power factor is to be adjusted and is selected from among the multiple power factor adjusting elements, to the load. However, if there are two target loads, the power factor of the second target load is adjusted by applying (connecting) at least one power factor adjusting element, which corresponds to the amount by which the power factor is to be adjusted and is selected from among the remaining multiple power factor adjusting elements, excluding the power factor adjusting element applied to the first target load. Of course, if there are three or more target loads, the third and fourth loads use the remaining power factor adjusting elements, excluding the power factor adjusting elements applied to the previous target loads.

Accordingly, when a target load is detected, the multi-power factor control unit 130 determines which power factor adjusting element is to be applied to which load, and performs selective control such that a condenser selected based on the determination is applied to the corresponding load. Here, selective control means control operation for determining the load to which a single power factor adjusting element is to be connected (applied).

For example, the first to third loads 111, 112, and 113 are target loads, and the amount by which the power factor is to be adjusted for the first load 111 is 15%, the amount by which the power factor is to be adjusted for the second load 112 is 12%, and the amount by which the power factor is to be adjusted for the third load is 10%. Also, as the power factor adjusting elements used to adjust power factors, for example, six condensers are arranged. Specifically, the first and second condensers may adjust a power factor by 10%, the third and fourth condensers may adjust a power factor by 5%, and the fifth and sixth condensers may adjust a power factor by 3%.

Accordingly, through selective control, the multi-power factor control unit 130 connects the first condenser, having a 10% adjustment factor, and the third condenser, having a 5% adjustment factor, to the first load 111 so as to adjust the power factor thereof by 15%, connects the second condenser, having a 10% adjustment factor, and the fifth condenser, having a 5% adjustment factor, to the second load 112 so as to adjust the power factor thereof by 12%, and connects the fourth condenser, having a 5% adjustment factor, and the sixth condenser, having a 3% adjustment factor, to the third load 113 so as to adjust the power factor thereof by 10%.

Here, the second condenser may be connected to the first load 111 in place of the first condenser, and the fourth condenser may be connected to the first load in place of the third condenser, that is, condensers having the same capacity may be interchangeable with each other.

Also, when the amount by which the power factor is to be adjusted is 12%, as in the case of the second load 112, power factor adjustment of more than 12% may be achieved within a preset range of error tolerance. For example, if the range of error tolerance is 3% and if the amount by which the power factor is to be adjusted is 12%, the power factor may be adjusted within a range from a minimum of 9% to a maximum of 15%, but it is desirable for the amount by which the power factor can be adjusted to be more than the required amount.

Meanwhile, if there are multiple target loads, the multi-power factor control unit 130 performs power factor control by randomly selecting the priority of the loads, or performs power factor control based on a preset priority thereof. Of course, power factor control is preferentially performed for a load having a higher priority.

Figure 3:
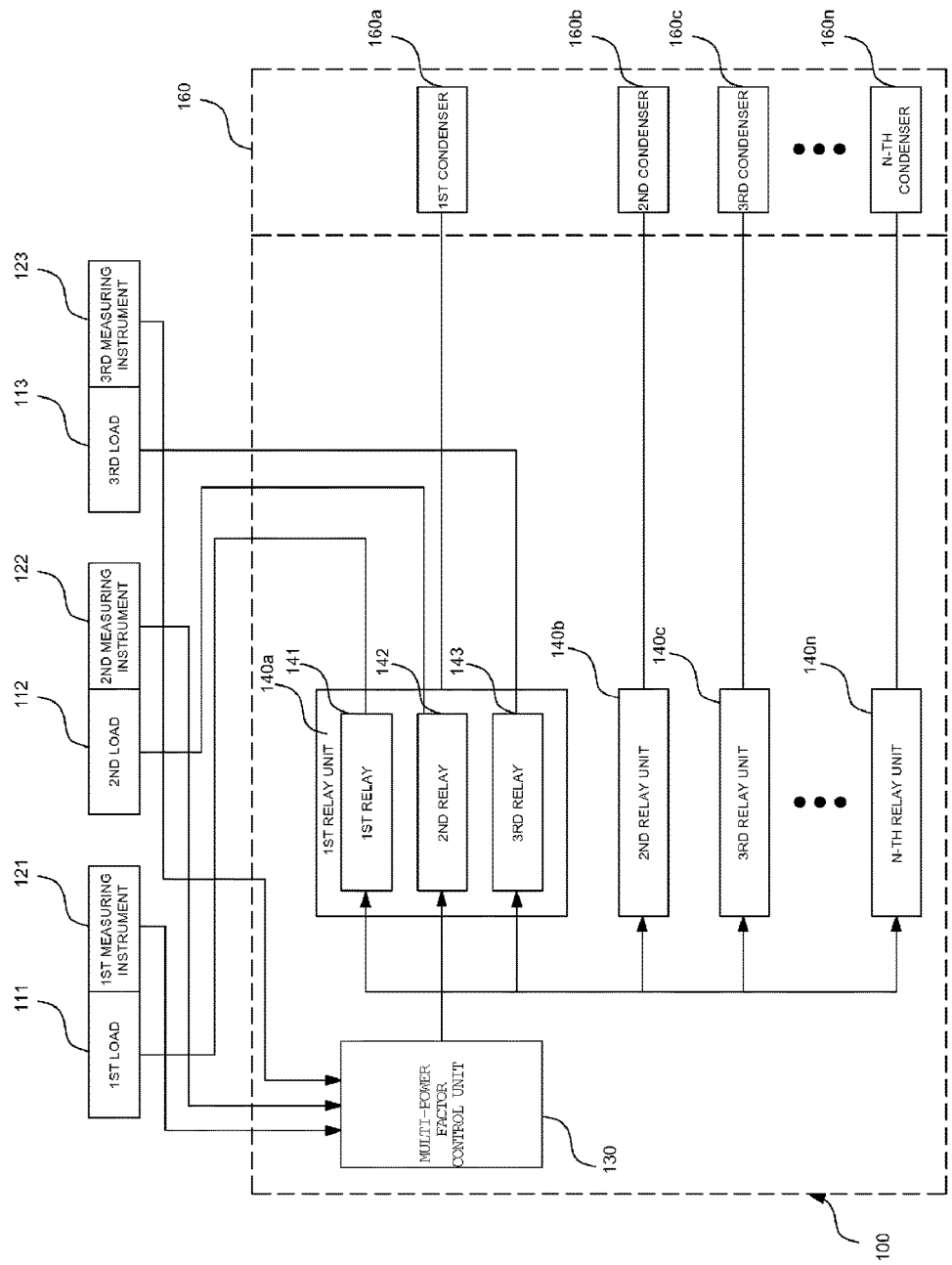
FIG. 3 is a block diagram of a multi-power factor controller according to a first embodiment of the present invention.

Hereinafter, an example in which the concept of the present invention in FIG. 1 is embodied is described with reference to FIG. 3. FIG. 3 is a block diagram of a multi-power factor controller according to a first embodiment of the present invention, and shows an example in which there are three loads and a condenser is used as a power factor adjusting element. Of course, the number of loads installed in the switching board based on the multi-power factor controller 100 may be two, four, or more than four, and the number of condensers (or reactors) installed therein may be determined depending on the number of loads installed therein.

As illustrated in FIG. 3, the multi-power factor controller 100 according to an embodiment of the present invention includes a multi-power factor control unit 130 and n relay units 140a to 140n.

Here, the first to third loads 111 to 113 are devices or apparatuses that consume power, such as transformers, motors, measuring instruments, or the like, and are connected to the multi-power factor controller 100 via the second connection port 20.

Also, the first to third measuring instruments 121 to 123 are connected to the corresponding loads 110 and thereby measure parameters required for calculating power factors, namely, power factor calculation parameters (for example, voltage, current, power, and the like) from the corresponding loads. Here, the first to third measuring instruments 121 to 123 are connected to the first connection port 10, and each port in the first connection port 10 is electrically connected to the multi-power factor control unit 130.

Meanwhile, each of the first to third measuring instruments 121 to 123 may calculate the power factor of a single load connected thereto and provide the calculated power factor to the multi-power factor control unit 130. In this case, the multi-power factor control unit 130 does not need to calculate the power factor for each of the loads 111 to 113. Hereinafter, the multi-power factor control unit 130 will be described as serving to calculate the power factor of each of the loads.

Also, the power factor adjusting element pack 160, which includes multiple condensers 160a to 160n, is connected to the multi-power factor controller via the third connection port 30.

Here, the multi-power factor control unit 130 receives the power factor calculation parameters from the first to third measuring instruments 121 to 123 and calculates the power factor of each of the loads using the received power factor calculation parameters. Then, the multi-power factor control unit 130 compares the calculated power factor with a preset reference power factor, designates a load having a power factor lower than the reference power factor, among the three loads 111 to 113, as the target load, and sets the difference between the calculated power factor and the reference power factor as the amount by which the power factor is to be adjusted for the target load, and adjusts the power factor by performing selective control.

Additionally, the multi-power factor control unit 130 is aware of the capacity of the each of the condensers 160a to 160n (that is, the amount by which a power factor can be adjusted), and may identify the condenser applied in order to control the power factor of the target load. Based on this, the multi-power factor control unit 130 prevents a condenser already being used for power factor control from being used for another target load when power factor control is performed for multiple target loads.

The n relay units 140a to 140n are used for selective connection based on selective control. Specifically, the n relay units 140a to 140n are used for selective connection in which a condenser to be connected (applied) to a target load is selected from among the n condensers 160a to 160n. Here, the n relay units 140a to 140n are respectively connected to the n condensers 160a to 160n via the third connection port 30. That is, a single relay unit is connected to a single condenser through a one-to-one connection.

The relay units 140a to 140n are configured as n units in order to correspond to the number of condensers that constitute the power factor adjusting element pack 160, and each of the relay units 140a to 140n consists of three relays corresponding to the three loads 111 to 113, that is, the first to third relays 141 to 143. Among the first to third relays 141 to 143 included in a single relay unit, the first relay 141 is connected to the first load 111 and connected to a single condenser, the second relay 142 is connected to the second load 112 and connected to the condenser to which the first relay 141 is connected, and the third relay 143 is connected to the third load 113 and connected to the condenser to which the first and second relays 141 and 142 are connected. Here, the first to third relays 141 to 143 connect the condenser connected thereto with loads by operating depending on control signals from the multi-power factor control unit 130, and thereby form power supply paths therebetween.

Meanwhile, in another example of the present invention, the multi-power factor controller 100 may further include a power factor adjusting element pack 160. In other words, the multi-power factor controller 100 may be configured such that the power factor adjusting element pack 160 is embedded therein. Also, in a further example of the present invention, the multi-power factor controller 100 may further include the first to third measuring instruments 121 to 123. In other words, the multi-power factor controller 100 may be configured such that the first to third measuring instruments 121 to 123 are embedded therein.

Figure 4:
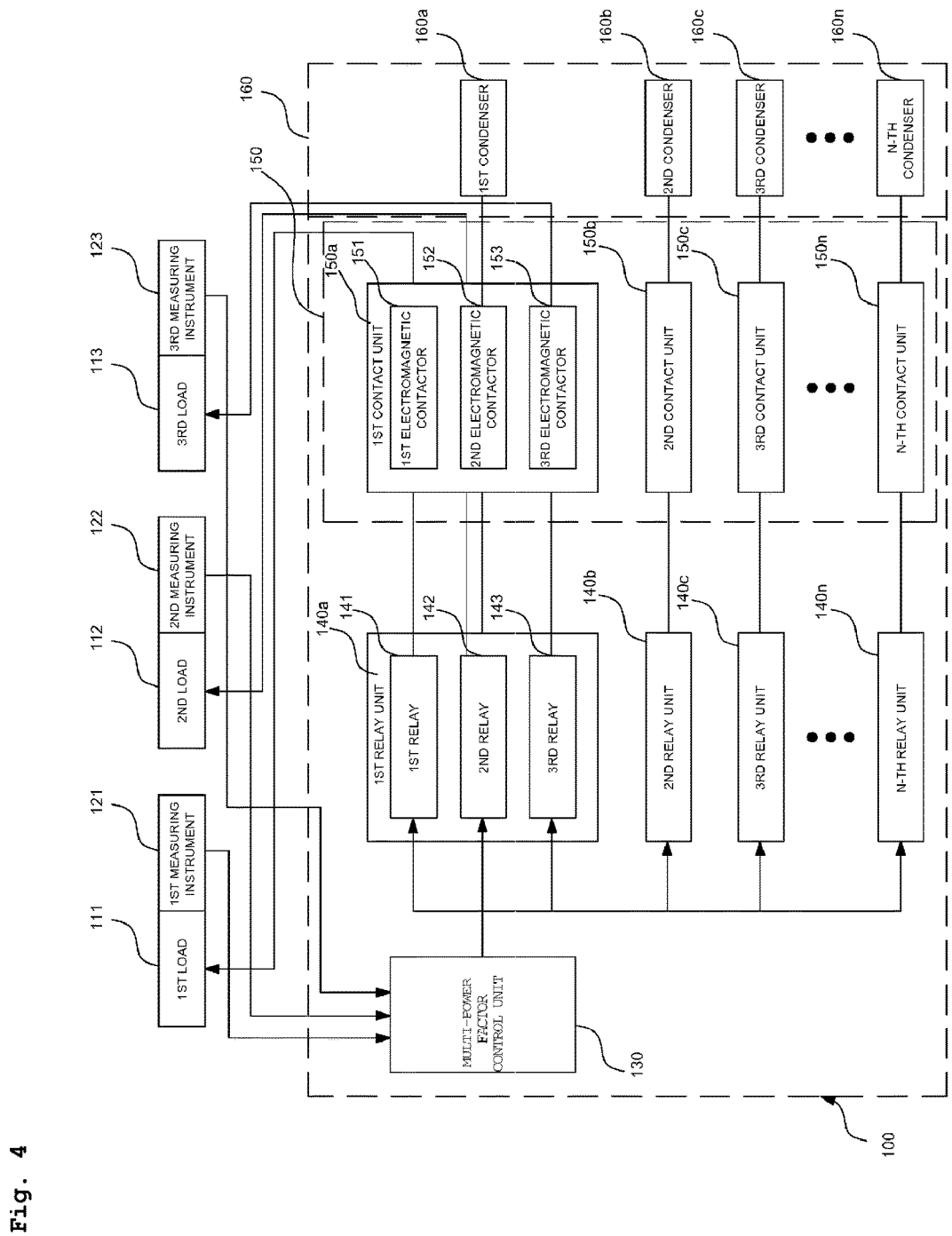
FIG. 4 is a block diagram of a multi-power factor controller according to a second embodiment of the present invention.

Hereinafter, the configuration of a multi-power factor controller 100 according to a second embodiment of the present invention will be described with reference to FIG. 4. FIG. 4 is a block diagram of a multi-power factor controller according to the second embodiment of the present invention, and shows an example in which there are three loads, and in which a condenser is used as a power factor adjusting element.

As illustrated in FIG. 4, a multi-power factor controller 100 according to the second embodiment of the present invention includes a multi-power factor control unit 130, n relay units 140a to 140n, and a contact device 150, which consists of n contact units 150a to 150n.

The multi-power factor controller 100 according to the second embodiment of the present invention has nearly the same configuration as that of the first embodiment of the present invention. However, the multi-power factor controller 100 according to the second embodiment of the present invention is different from that of the first embodiment in that the contact device 150 is installed between the power factor adjusting element pack 150 and the multiple relay units 140a to 140n in order to protect relays 141 to 143 when controlling a power factor.

Accordingly, the n relay units 140a to 140n and the n contact units 150a to 150n, which constitute the contact device 150, are used for selective connection based on selective control. In other words, the n relay units 140a to 140n and the n contact units 150a to 150n are used for selective connection, in which a condenser to be connected (applied) to a target load is selected from among the n condensers 160a to 160n.

To this end, the contact units are configured as n contact units 150a to 150n corresponding to the number of installed condensers, and each of the contact units 150a to 150n consists of three electromagnetic contactors corresponding to the three loads 111 to 113, namely, first to third electromagnetic contactors 151 to 153. Also, a single contact unit is connected to a single condenser. Specifically, the three electromagnetic contactors 151 to 153, included in the single contact unit, are connected to a single condenser. Also, among the three electromagnetic contactors 151 to 153 included in a single contact unit, the first electromagnetic contactor 151 is connected to the first load 111, the second electromagnetic contactor 152 is connected to the second load 112, and the third electromagnetic contactor 153 is connected to the third load 113.

Consequently, the three electromagnetic contactors, included in a single contact unit, are connected to the same condenser and are connected to different loads.

Additionally, the relay units are configured as n relay units 140a to 140n in order to correspond to the number of installed condensers, and each of the relay units 140a to 140n consists of three relays corresponding to the three loads 111 to 113, that is, the first to third relays 141 to 143. Among the first to third relays 141 to 143 included in a single relay unit, the first relay 141 is connected to the first electromagnetic contactor 151, the second relay 142 is connected to the second electromagnetic contactor 152, and the third relay 143 is connected to the third electromagnetic contactor 153. Also, the first to third relays 141 to 143 turn on or off the electromagnetic contactors connected thereto by operating in response to control signals from the multi-power factor control unit 130.

Consequently, a single electromagnetic contactor is turned on or off using a single relay, and when a single electromagnetic contactor is turned on, the condenser and the load connected to the corresponding electromagnetic contactor are connected with each other.

Figure 5:
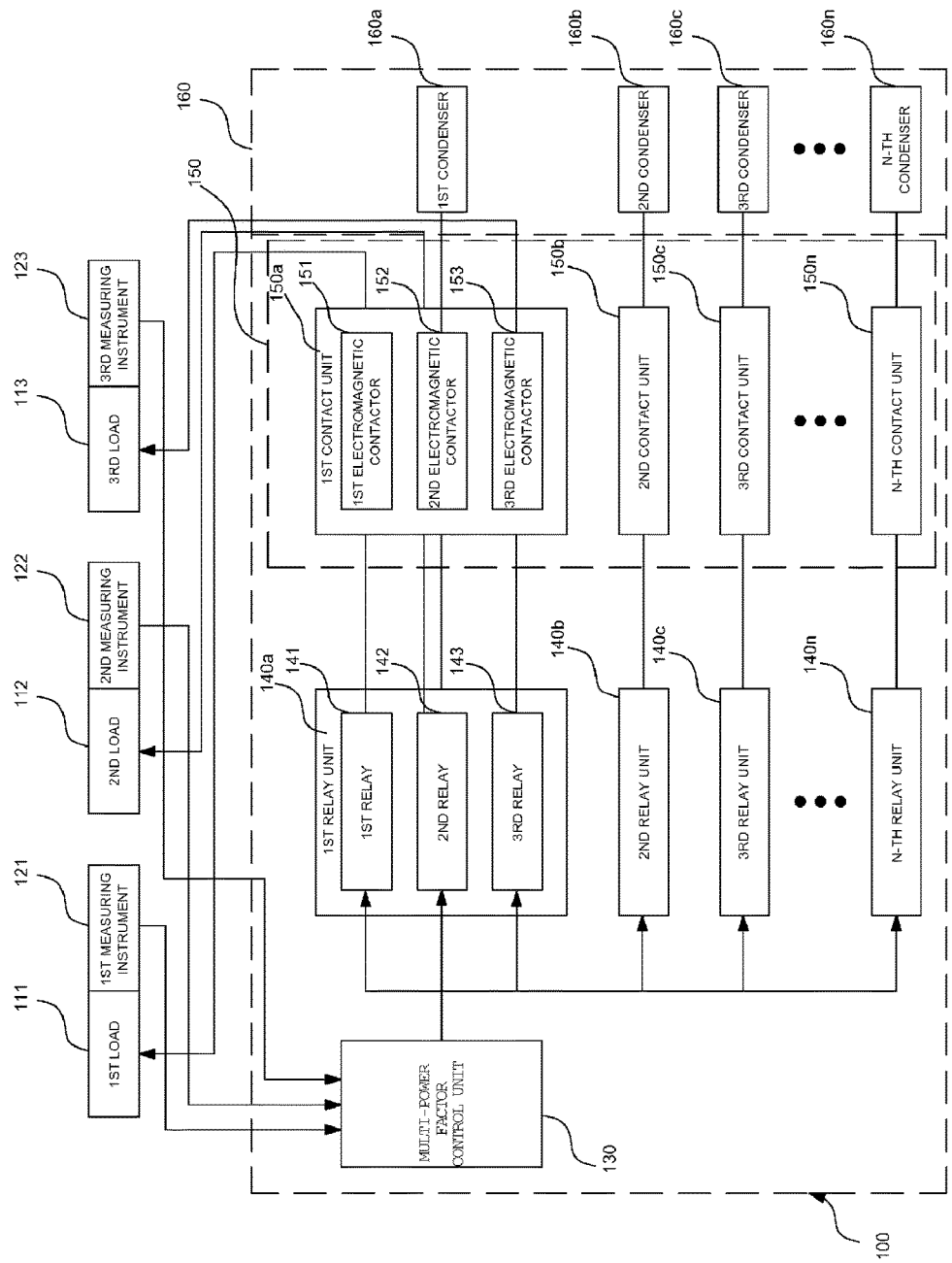
FIG. 5 is a flowchart of the operation of a multi-power factor controller according to the first embodiment of the present invention.

Hereinafter, multi-power factor control operation according to the first embodiment of the present invention will be described with reference to FIG. 5. FIG. 5 is a flowchart of the operation of the multi-power factor controller according to the first embodiment of the present invention, and shows an example in which there is one target load.

As illustrated in FIG. 5, the multi-power factor control unit 130 collects power factor calculation parameters from the first to third measuring instruments 121 to 123 at step S501 and calculates the current power factor of each of the loads 111 to 113 at step S502 using the collected power factor calculation parameters.

Then, the multi-power factor control unit 130 compares the calculated power factor with a preset reference power factor at step S503 and determines whether there is a load having a power factor that is lower than the reference power factor at step S504. If it is determined at step S504 that there is a load having a power factor lower than the reference power factor, the multi-power factor control unit 130 designates the load as a target load, the power factor of which is to be controlled, at step S505. If it is determined that there is no target load, the process returns to step S501 for collecting power factor calculation parameters for each of the loads.

Here, assume that the multi-power factor control unit 130 determines at step S506 that a single load, for example, the first load 111, is a target load through the process of step S505.

When it is determined that the first load 111 is a target load, the multi-power factor control unit 130 detects the difference between the current power factor of the first load 111 and the reference power factor, and sets the difference as the amount to be adjusted at step S507.

Then, the multi-power factor control unit 130 checks which of the n condensers 160a to 160c are available, checks the capacity of each of the available condensers, compares the capacity of each of the available condensers with the amount by which the power factor is to be adjusted, and determines at step S508 whether the power factor for the first load 111 can be adjusted.

If it is determined at step S508 that the power factor cannot be adjusted, the multi-power factor control unit 130 controls the first relays 141 of the relay units 140a to 140n in order to connect all of the available condensers to the first load 111, and thereby turns on the first electromagnetic contactors 151, connected to the corresponding first relays, at step S511.

Conversely, if it is determined at step S508 that the power factor can be adjusted, the multi-power factor control unit 130 selects at least one condenser, which may adjust a power factor more than the amount by which the power factor is to be adjusted within a preset range of error tolerance, from among the available condensers based on the capacity of each of the condensers at step S509.

Then, the multi-power factor control unit 130 controls the first relay 141 of the relay unit, which is coupled to the at least one selected condenser, and thereby applies (connects) the at least one selected condenser to the first load 111, whereby the power factor for the first load 111 is adjusted at step S510.

Figure 6:
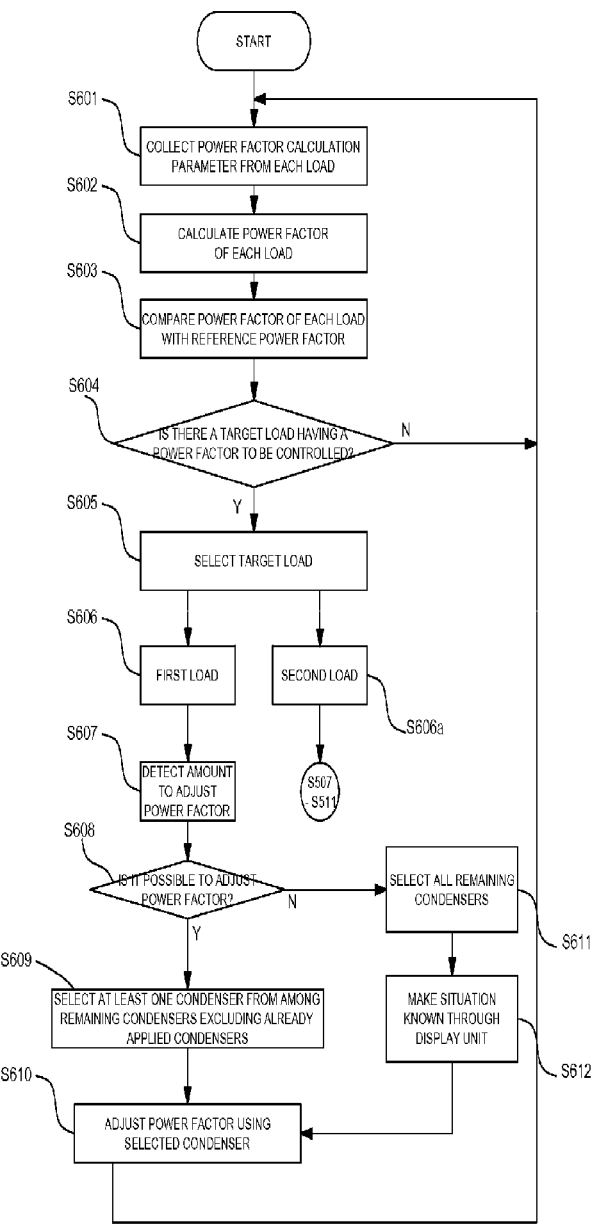
FIG. 6 is a flowchart of the operation of a multi-power factor controller according to the second embodiment of the present invention.

Hereinafter, multi-power factor control operation according to the second embodiment of the present invention will be described with reference to FIG. 6. FIG. 6 is a flowchart of the operation of a multi-power factor controller according to the second embodiment of the present invention, and shows an example in which there are two target loads.

As illustrated in FIG. 6, target loads are detected by performing steps S601 to S605, which are the same as the above-mentioned steps S501 to S505.

Here, assume that the multi-power factor control unit 130 determines at step S606 that two loads, for example, the first load 111 and the second load 112, are target loads through the process of step S605.

When it is determined that the first and second loads 111 and 112 are target loads, the multi-power factor control unit 130 selects a target load, the power factor of which is to be controlled first, from among the first and second loads 111 and 112. Here, the multi-power factor control unit 130 may randomly select the target load, the power factor of which is to be controlled first, or may perform power factor control according to a preset priority.

Assume that the multi-power factor control unit 130 determines at step S606a that the second load 112 is a target load, the power factor of which is to be controlled first. Accordingly, the multi-power factor control unit 130 controls the power factor of the second load 112 by performing the above-mentioned steps S507 to S511.

Then, the multi-power factor control unit 130 performs power factor control for the first load 111 at step S606. To this end, the multi-power factor control unit 130 detects the difference between the current power factor of the first load 111 and the reference power factor, and sets the difference as the amount to be adjusted at step S607.

Then, the multi-power factor control unit 130 detects that the remaining condensers among the n condensers 160a to 160c, excluding the condenser applied to the second load 112, are available, checks the capacity of each of the available condensers, compares the capacity of each of the available condensers with the amount by which the power factor is to be adjusted, and determines at step S608 whether the power factor for the first load 111 can be adjusted.

If it is determined at step S608 that the power factor cannot be adjusted, the multi-power factor control unit 130 controls the first relays 141 of the relay units 140a to 140n in order to connect all of the available condensers to the first load 111, and thereby turns on the first electromagnetic contactors 151, connected to the corresponding first relays, at step S611.

Here, the multi-power factor control unit 130 informs a worker that the power factor cannot be sufficiently adjusted through a display unit 170 at step S612.

Conversely, if it is determined at step S608 that the power factor can be adjusted, the multi-power factor control unit 130 selects at least one condenser, which may adjust a power factor more than the amount by which the power factor is to be adjusted within a preset range of error tolerance, from among the available condensers based on the capacity of each of the condensers at step S609.

Then, the multi-power factor control unit 130 controls the first relay 141 of the relay unit, which is coupled to the at least one selected condenser, and thereby applies (connects) the at least one selected condenser to the first load 111, whereby the power factor of the first load 111 is adjusted at step S610.

The above-described embodiment of the present invention may be implemented not only through the device and method but also through a program that implements the functions corresponding to the configuration of the embodiment of the present invention or a recording medium in which such a program is recorded. The implementation may be easily accomplished from the above-described embodiment by those skilled in the art to which the present invention pertains.

Although the embodiment of the present invention has been described, the scope of the present invention is not limited thereto, but various modifications and improvement that those who skilled in the art perform using the basic concept of the present invention defined in the appended claims also pertain to the scope of the present invention.

DESCRIPTION OF THE REFERENCE NUMERALS IN THE DRAWINGS

100: multi-power factor controller
110: load 120: measuring unit
130: multi-power factor control unit
140a to 140n: relay unit
141 to 143: relay
150: contact device
150a to 150n: contact unit
151 to 153: electromagnetic contactor
160: power factor adjusting element pack
160a to 160n: condenser

The invention claimed is:
1. A multi-power factor controller, comprising:
k measuring units, to which k loads and a power supply path are connected, each of the k measuring units being connected with each of the k loads and measuring a power factor calculation parameter of a connected load;
n power factor adjusting elements;
n contactors, connected to the k loads and respectively connected to the n power factor adjusting elements, each of the n contactors including k electromagnetic contactors, which are respectively connected to the k loads and are connected to one of the power factor adjusting elements;
n relay units, each of the n relay units having k relays, respectively connected to the k electromagnetic contactors, for deciding whether to turn on or off the electromagnetic contactors connected thereto; and
a multi-power factor control unit for calculating a power factor of each of the loads using the power factor calculation parameter provided from each of the k measuring units, detecting a target load and an amount by which a power factor is to be adjusted for the target load by comparing the calculated power factor of each of the loads with a preset reference power factor, selecting at least one first power factor adjusting element corresponding to the amount by which the power factor is to be adjusted for the target load, and controlling a corresponding relay to turn on the electromagnetic contactor to which the first power factor adjusting element and the target load are connected,
wherein n and k are defined as a positive integer,
wherein the k relays of each relay unit are connected to the k loads through each contactor to have a one-to-one correspondence relationship, and the n relay units are connected to the power factor adjusting elements through the n contactors to have a one-to-one correspondence relationship, and
wherein each relay unit is located between the multi-power factor control unit and each contactor, and each contactor is located between each relay unit and each load and between each relay unit and each power factor adjusting element.

* * * * *